US011934595B2

(12) United States Patent
Vlasov et al.

(10) Patent No.: US 11,934,595 B2
(45) Date of Patent: Mar. 19, 2024

(54) VARIABLE RESPONSE ROTARY INPUT CONTROL FOR A COMPUTER PERIPHERAL DEVICE

(71) Applicant: Logitech Europe S.A., Lausanne (CH)

(72) Inventors: Maxim Vlasov, Geneva (CH); Nicolas Ramond, Lugrin (FR); Jean-Claude Dunant, Fey (CH); Patrick Cerisier, Annecy le Vieux (FR)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/449,162

(22) Filed: Jun. 21, 2019

(65) Prior Publication Data

US 2020/0004346 A1 Jan. 2, 2020

Related U.S. Application Data

(60) Provisional application No. 62/690,591, filed on Jun. 27, 2018.

(51) Int. Cl.
*G06F 3/038* (2013.01)
*G06F 3/01* (2006.01)
*G06F 3/0354* (2013.01)
*G06F 3/0362* (2013.01)
*H01F 7/02* (2006.01)
*H01F 7/20* (2006.01)
*H01F 27/28* (2006.01)

(52) U.S. Cl.
CPC .............. *G06F 3/038* (2013.01); *G06F 3/016* (2013.01); *G06F 3/03543* (2013.01); *G06F 3/0362* (2013.01); *H01F 7/021* (2013.01); *H01F 7/20* (2013.01); *H01F 27/28* (2013.01)

(58) Field of Classification Search
CPC ........ G06F 1/169; G06F 3/016; G06F 3/0213; G06F 3/03; G06F 3/033; G06F 3/0354; G06F 3/03543; G06F 3/0362; G06F 3/038; G06F 3/0383; H01F 1/03; H01F 7/02; H01F 7/0205; H01F 7/021; H01F 7/0273; H01F 7/0278; H01F 7/0284; H01F 7/06; H01F 7/064; H01F 7/20; H01F 27/28
See application file for complete search history.

(56) References Cited

U.S. PATENT DOCUMENTS 10,454,341 B1 * 10/2019 Grundmann .............. H01F 7/20
2006/0001657 A1 * 1/2006 Monney ................ G06F 3/0312
345/184

(Continued)

*Primary Examiner* — Keith L Crawley
(74) *Attorney, Agent, or Firm* — Kilpatrick Townsend & Stockton LLP

(57) ABSTRACT

A user input device that includes a rotary input control is described herein. The rotary input control includes first and second ferritic substrates; first and second permanent magnets extending between the first and second ferritic substrates to form a magnetic circuit; one or more magnetizing coils wrapped around the first permanent magnet; and a wheel defining a central volume within which the first and second ferritic substrates, the first and second permanent magnets and the one or more magnetizing coils are positioned. The user input device also includes a control system configured to direct current to the one or more magnetization coils to change a magnetization of the first permanent magnet to adjust a resistance profile of the rotary input control.

14 Claims, 12 Drawing Sheets

(56) References Cited

U.S. PATENT DOCUMENTS

| | | | |
|---|---|---|---|
| 2007/0188453 A1* | 8/2007 | O'Sullivan | G06F 3/0312 |
| | | | 345/163 |
| 2007/0188454 A1* | 8/2007 | O'Sullivan | G09G 5/08 |
| | | | 345/163 |
| 2015/0221426 A1* | 8/2015 | Furuki | G06F 3/0362 |
| | | | 335/219 |
| 2016/0218648 A1* | 7/2016 | Hijikata | H02P 8/12 |
| 2018/0164901 A1* | 6/2018 | O'Mahony | G06F 3/02 |
| 2019/0121452 A1* | 4/2019 | Hsueh | G06F 3/03543 |
| 2019/0333670 A1* | 10/2019 | Arnold | H01F 13/003 |
| 2019/0385421 A1* | 12/2019 | Shah | G08B 6/00 |
| 2020/0005977 A1* | 1/2020 | Keltz | H01F 7/0205 |

\* cited by examiner

VARIABLE RESPONSE ROTARY INPUT CONTROL FOR A COMPUTER PERIPHERAL DEVICE

CROSS-REFERENCES TO RELATED APPLICATIONS

The present application claims the benefit of and priority to U.S. Provisional Patent Application No. 62/690,591, filed on Jun. 27, 2018, entitled "Electromagnetic Mode Change of Peripheral Interface Wheel," the entire contents of which is herein incorporated by reference for all purposes.

BACKGROUND

Unless otherwise indicated herein, the materials described in this section are not prior art to the claims in this application and are not admitted to be prior art by inclusion in this section.

Physical computer peripheral interface devices can include keyboards, mice, joysticks, wheels, etc., that can be physical devices that a user manipulates to interface with a computer device. Physical computer peripheral interface devices can include wheel input elements that a user can manipulate. For example, computer mice can include scroll wheels that can be used to pan a viewing window across an image or document displayed by a computer device in response to rotating the scroll wheel around an axis. Interface wheels can operate across a plurality of resistance profiles. For example, a mouse scroll wheel may operate selectively between a free-wheeling mode and a ratcheting mode each corresponding to a respective resistance profile. Mechanisms for more efficiently switching between one or more resistance profiles are desirable.

SUMMARY

This disclosure describes various mechanisms by which the feedback response of a rotary input control may be changed in an energy efficient and reliable manner.

A user input device is disclosed and includes the following: a rotary input control, comprising: a wheel; and an electropermanent magnet assembly, comprising: a magnetizing device, and a permanent magnet coupled to the magnetizing device and emitting a magnetic field; and a control system configured to modulate an amount of electrical energy supplied to the magnetizing device to change a resistance profile of the rotary input control, the modulation switching the permanent magnet from a first state in which the magnetic field has a first magnetic flux to a second state in which the magnetic field has a second magnetic flux greater than the first magnetic flux, the magnetic field having a first polarity in both the first and second states. In some aspects, the electropermanent magnet assembly further comprises ferritic substrates positioned at opposing ends of the electropermanent magnet assembly, each ferritic substrate comprising a first plurality of teeth protruding radially from the ferritic substrate and toward the wheel. The wheel may define a central opening within which the electropermanent magnet assembly is disposed and wherein the wheel comprises a second plurality of teeth protruding from the wheel and into the central opening. In some embodiments, the user input device is a computer mouse.

In some aspects, the resistance profile is a ratcheting resistance profile when the permanent magnet is in the first state, the resistance profile being generated by a magnetic flux emitted by the electropermanent magnet assembly that flows through the first plurality of teeth to interact with corresponding ones of the second plurality of teeth protruding from the wheel. The permanent magnet may be a first permanent magnet and the electropermanent magnet assembly further comprises a second permanent magnet, the first and second permanent magnets being aligned and cooperating with magnetic poles of the ferritic substrates to form a magnetic circuit. The user input device may further comprise a shaft that rotatably couples the electropermanent magnet assembly to the wheel. The permanent magnet can be a first permanent magnet and the electropermanent magnet assembly further comprises a second permanent magnet, wherein the shaft extends between the first and second permanent magnets. In some implementations, when in the first state the resistance profile applies no force to the wheel, and when in the second state the resistance profile applies a ratcheting force to the wheel. In some cases, in the first state the resistance profile is applied by interaction between a magnetic field emitted by the electropermanent magnet assembly and magnetically attractable materials of the wheel.

Another user input device is disclosed and includes the following: a rotary input control, comprising: a magnetizing coil; a first permanent magnet extending through the magnetizing coil; a second permanent magnet, the first permanent magnet and the second permanent magnet being configured to set a resistance profile for the wheel by cooperatively emitting a magnetic field that is operable to oppose rotation of the wheel; and a control system configured to switch between three or more different resistance profiles of the rotary input control by varying an amount of electrical energy supplied to the magnetizing coil. In some cases, the user input device can be a computer mouse. The control system may include a capacitor configured to deliver a current to the one or more magnetization coils to control the amount of electrical energy supplied by the magnetizing coil. The control system can comprise an analog feedback loop. The user input device can further include a shaft about which the wheel rotates that extends between the first permanent magnet and the second permanent magnet. In some aspects, the wheel can define a central volume within which the first and second permanent magnets and the magnetizing coil are positioned. Some embodiments may further comprise a first ferritic substrate comprising a first plurality of teeth and a second ferritic substrate comprising a second plurality of teeth, wherein the first and second permanent magnets extend between the first and second ferritic substrates to form a magnetic circuit. The wheel may be mechanically decoupled from the first and second permanent magnets in certain embodiments.

In certain embodiments, a user input device may comprise: a rotary input control, comprising: a wheel; and an electropermanent magnet assembly, comprising: a magnetizing coil, a first permanent magnet extending through the magnetizing coil, and a second permanent magnet adjacent to the first permanent magnet; and a controller configured to set a resistance profile of the rotary input control by regulating an amount of electrical energy supplied to the magnetizing coil in accordance with a predetermined calibration curve associated with the electropermanent magnet assembly. In some aspects, the predetermined calibration curve defines an amount of resistance to rotation of the wheel resulting from supplying different amounts of electrical energy to the magnetizing coil. The electropermanent magnet assembly can further comprise a first ferritic substrate at a first end of the first and second permanent magnets and a second ferritic substrate at a second end of the first and second permanent magnets, the first and second ferritic substrate comprising radially protruding teeth.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
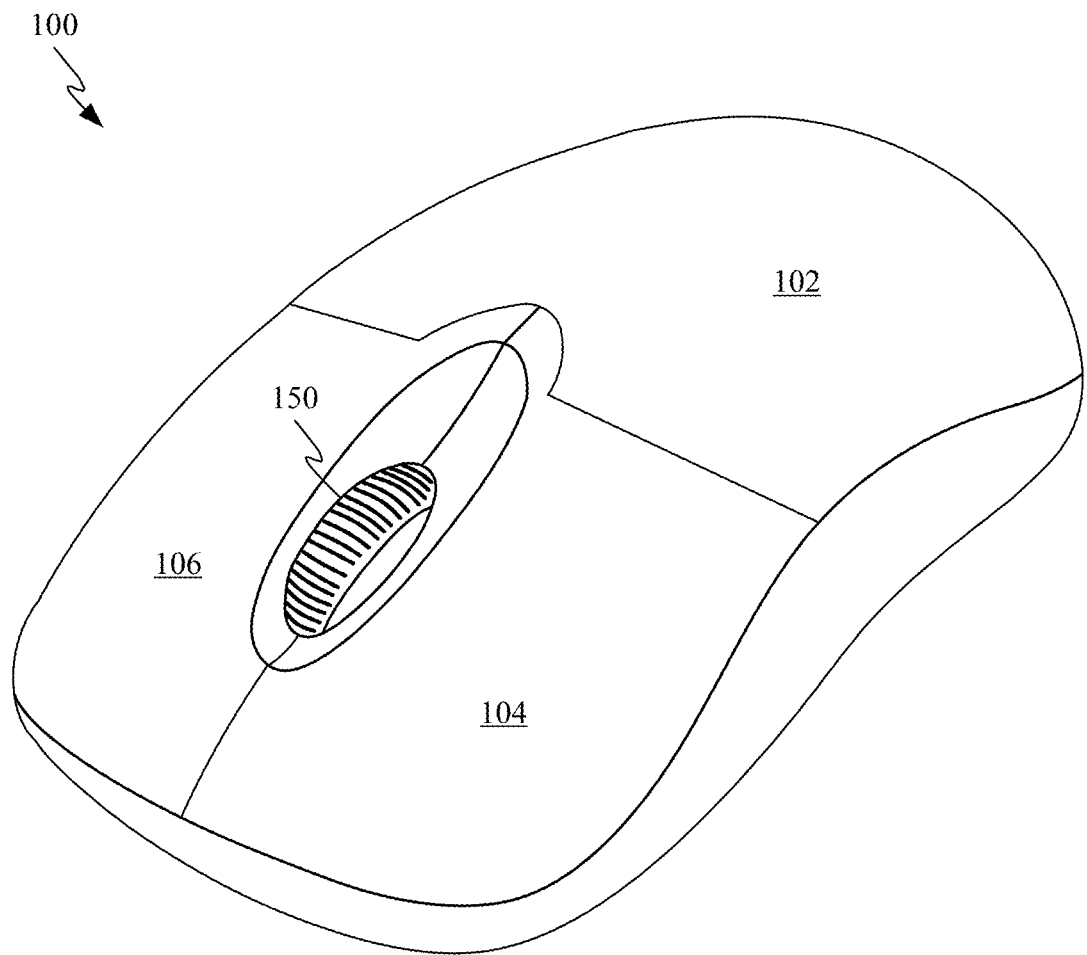
FIG. 1 shows an exemplary user input device 100 suitable for use with the described embodiments and taking the form of a wireless mouse.

While certain embodiments are described, these embodiments are presented by way of example only, and are not intended to limit the scope of protection. The apparatuses and systems described herein may be embodied in a variety of other forms. Furthermore, various omissions, substitutions, and changes in the form of the example methods and systems described herein may be made without departing from the scope of protection.

A peripheral input device used as an interface between a user and a computer device can include a rotary input control as a physical element. The user may rotate the input control to cause a corresponding command to be sent to the computer device. An example of such an input control is a scroll wheel that can be located between the left and right buttons on top of a peripheral input device. Scroll wheels can be used to pan a field of view of a computer display. For example, a scroll wheel can be used by a user to scroll through a view of a document displayed on a computer screen. Other possible controls are compatible with the described embodiments that can include, e.g., a rotary dial or rotary encoder. However, for the purpose of simplicity examples of a scroll wheel will be used, but this should not limit the contemplated scope of the described embodiments.

A scroll wheel may have different modes of operation. For example, one mode of operation can be a free-wheeling mode wherein the scroll wheel can be rotated around an axis with a relatively constant and low coefficient of friction (which can be referred to as a first resistance profile). Using such a mode, a user can swiftly pan their view over a document with a single finger movement to rotate the wheel. Another mode can be a ratcheted mode wherein the scroll wheel encounters periodic segments of relatively high friction with lower friction segments between (which can be referred to as a resistance profile different from the first resistance profile). Such a mode can allow a user to have greater control when panning through a document as a single finger movement to rotate the wheel may result in a metered panning of a view.

Some peripheral input devices allow a user to selectively enable a different resistance profile for application to a scroll wheel to change the behavior of the scroll wheel according to a corresponding computer application, intended use, or user preference, for example. Different mechanisms are disclosed that can be used to change the resistance profile applied to a wheel of a peripheral input device. Each of the mechanisms provide different power usage, noise, user feel, and actuation time characteristics. In some embodiments, the resistance profile can be changed in accordance with parameters provided by an active application. For example, the resistance profile could increase sharply to signify a brief pause/stop to scrolling to emphasize a particular feature. Additional force applied to overcome the increased resistance profile can allow scrolling to continue and could in certain instances initiate a change back to the initial resistance profile.

These and other embodiments are discussed below with reference to FIGS. 1-8; however, those skilled in the art will readily appreciate that the detailed description given herein with respect to these figures is for explanatory purposes only and should not be construed as limiting.

FIG. 1 shows an exemplary user input device 100 suitable for use with the described embodiments and taking the form of a wireless mouse. Wireless mouse 100 includes a housing 102 and input buttons 102 and 104. Positioned between input buttons 102 and 104 is a rotary input control 150 taking the form of a scrolling wheel. Rotary input control 150 can include a mechanism that can be used to implement a ratcheting resistance profile for rotation of rotary input control 150 around axis 152. Rotary input control 150 can include or be coupled to indentations 154 having a "seesaw" cross-sectional profile. The mechanism can include an electropermanent magnetic actuator for changing a resistance profile associated with rotation of rotary input control 150.

Figure 2A:
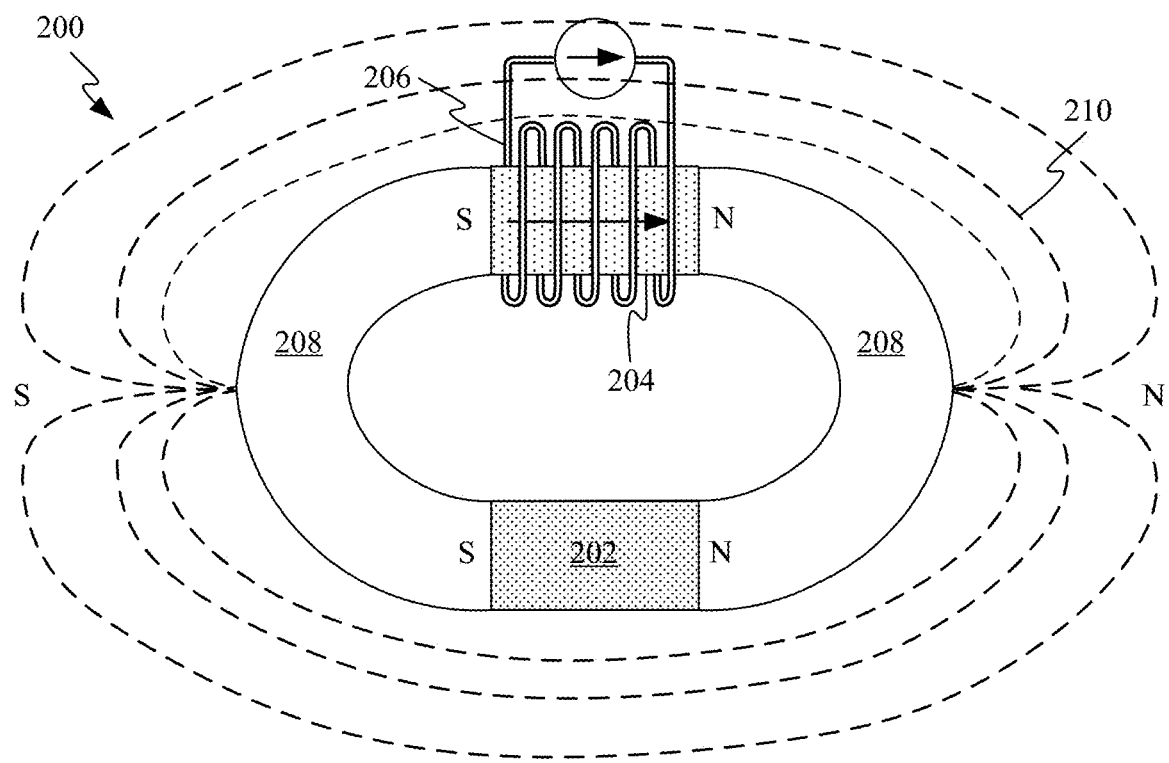
FIGS. 2A-2B show an exemplary electropermanent magnet.
Figure 2B:
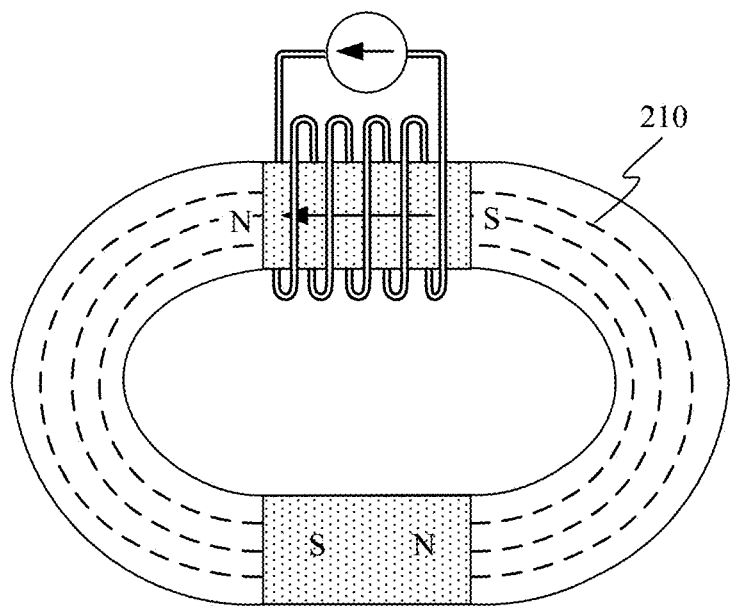

FIGS. 2A-2B show an exemplary electropermanent magnet 200. In particular, electropermanent magnet 200 includes a first permanent magnet 202 and a second permanent magnet 204. First permanent magnet 202 can have a higher intrinsic coercivity than second permanent magnet 204. In some embodiments, permanent magnet 202 can take the form of a rare earth (e.g., Neodymium Iron Boron or Samarium Cobalt) magnet and second permanent magnet 204 can take the form of a Ferromagnetic (e.g., Alnico or ferrite) magnet. The lower intrinsic coercivity of second permanent magnet 204 allows for a magnetizing device taking the form of magnetizing coil 206 to emit a magnetic field of sufficient strength to reverse a polarity of the magnetic field emitted by second permanent magnet 204 without affecting the magnetization of first permanent magnet 202. For example, in some embodiments, an intrinsic coercivity of first permanent magnet 202 can be over ten times greater than an intrinsic coercivity of second permanent magnet 204. The lower intrinsic coercivity of second permanent magnet 204 also reduces the amount of electrical energy expended to flip the polarity of second permanent magnet 204, thereby allowing for more efficient operation of electropermanent magnet 200. First permanent magnet 202 and second permanent magnet 204 are each positioned between and in direct contact or at least close contact with ferritic substrates 208. Ferritic substrates 208 can be formed from a ferritic material such as mild steel, having an even lower intrinsic coercivity than second permanent magnet 204. Ferritic substrates 208 helps guide the magnetic fields emitted by first permanent magnet 202 and second permanent magnet 204. In some embodiments a size and shape of ferritic substrates 208 can be adjusted to produce a magnetic field having a desired size and shape.

FIG. 2A shows dashed lines 210 depicting a magnetic flux emitted by electropermanent magnet 200 that show how with both first and second permanent magnets 202 and 204 oriented in the same direction, magnetic flux is released from electropermanent magnet 200 to create well defined north and south poles. This magnetic field is symmetrical, as depicted, when the strengths of the magnetic fields emitted by the two permanent magnets are about the same.

FIG. 2B shows how electropermanent magnet 200 can be shifted from a first state in which a magnetic field extends out of electropermanent magnet 200 to a second state in which the magnetic field is contained within electropermanent magnet 200. Shifting electropermanent magnet 200 from the first state to the second state can be performed by reversing the polarity of first permanent magnet 202 so that it is oriented in the opposite direction as the polarity of second permanent magnet 204. The magnetic flux represented by dashed lines 210 and cooperatively generated by both permanent magnets 202/204 remains substantially contained within and circulating through ferritic substrates 208, first permanent magnet 202 and second permanent magnet 204. This results in electropermanent magnet 200 emitting little to no magnetic field. It should be noted that in some embodiments, electropermanent magnet 200 can have more than two states. For example, by varying an amount of energy supplied by magnetizing coil 206 during a re-magnetizing operation, the size and strength of the field emitted by electropermanent magnet 200 can be adjusted to provide a desired strength. It should be appreciated that the described state variation can be applied to any of the embodiments described herein.

Figure 3A:
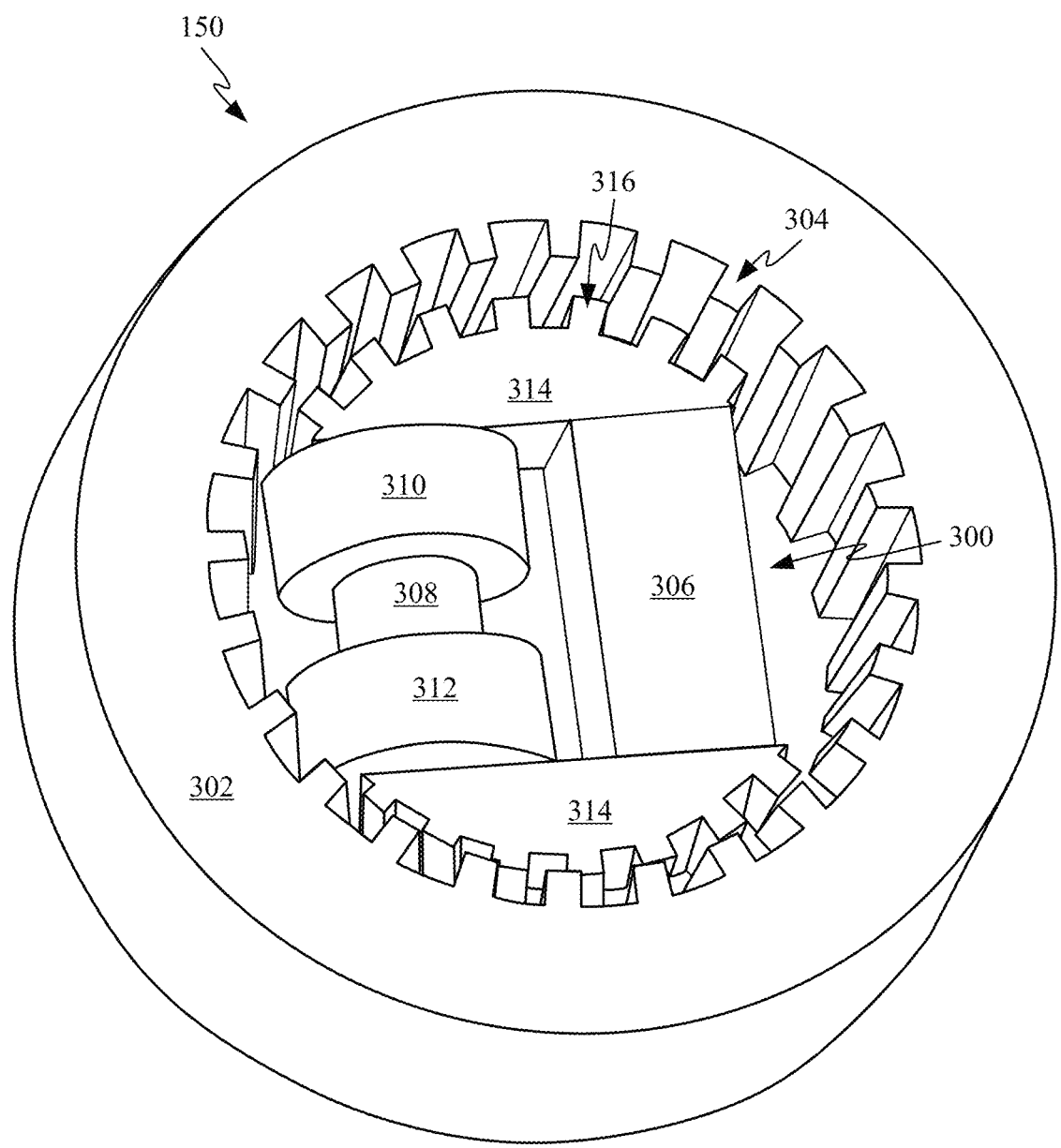
FIG. 3A shows a perspective view of an exemplary implementation in which an electropermanent magnet is configured to alter a resistance profile of a rotary input control compatible with the device depicted in FIG. 1.

FIG. 3A shows a perspective view of an exemplary implementation in which an electropermanent magnet is configured to alter a resistance profile of a rotary input control 150 compatible with the device depicted in FIG. 1. The electropermanent magnet 300 is disposed within a central opening defined by ferromagnetic wheel 302. Ferromagnetic wheel 302 includes multiple teeth 304 protruding into the central opening and toward electropermanent magnet 300. Electropermanent magnet 300 includes a first permanent magnet 306 and a second permanent magnet 308. Magnetizing coils 310 and 312 are wrapped around different portions of second permanent magnet 308 and configured to reverse a polarity of the magnetic field emitted by second permanent magnet 308 in order to change a resistance profile of rotary input control 150. It should be noted that while a specific magnetizing coil configuration is shown it should be appreciated that a remagnetizing magnetic field can be generated in other ways such as through the application of a magnetic field using a strong permanent magnet. Ferritic substrates 314 each includes radially protruding teeth 316 that are spaced at the same interval as teeth 304 of ferromagnetic wheel 302. Radially protruding teeth 316 concentrate the magnetic field emitted by electropermanent magnet 300 so that rotation of ferromagnetic wheel 302 generates a resistance profile that provides a user with a varying amount of resistance, where the variation in resistance occurs at a rate that corresponds to a speed at which ferromagnetic wheel 302 is rotating. The variation in resistance is caused by interaction between the magnetic field emitted by electropermanent magnet 300 and ferromagnetic materials within the teeth of ferromagnetic wheel 302.

Figure 3B:
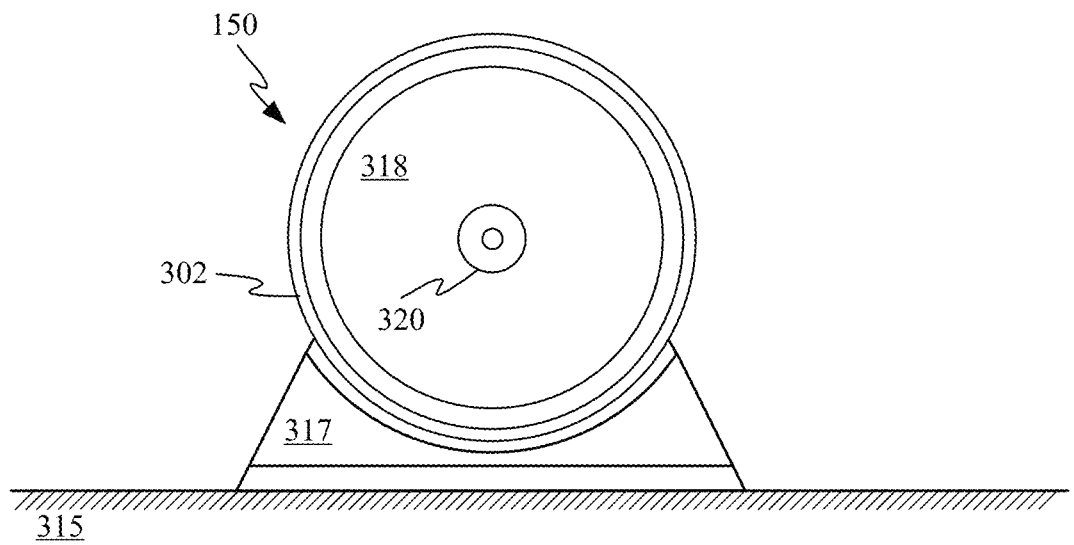
FIGS. 3B-3C show a support structure for a rotary input control.
Figure 3C:
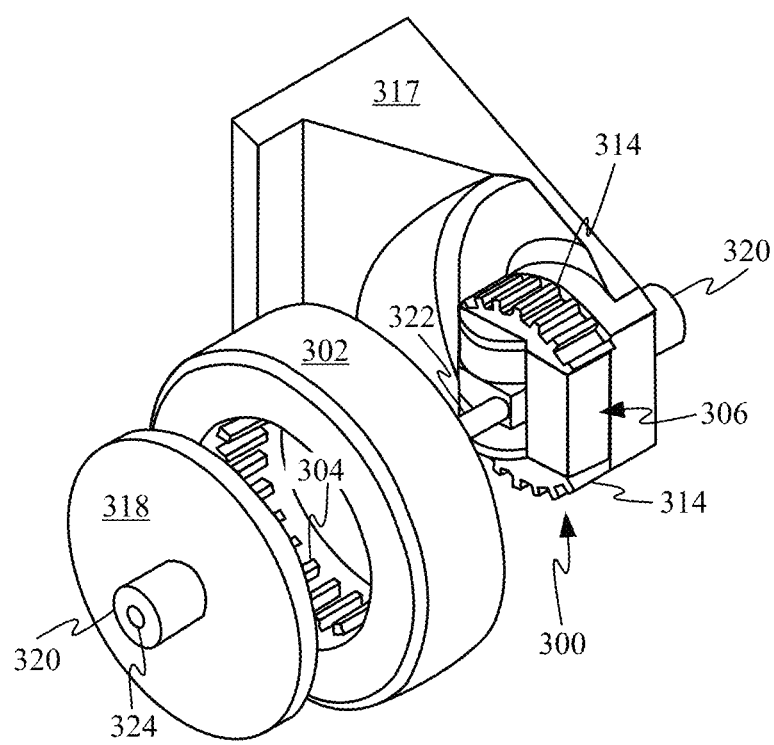

FIGS. 3B-3C show a support structure for rotary input control 150. FIG. 3B shows a side view of rotary input control 150 elevated above a support surface 315 by a support structure 317. The central opening of ferromagnetic wheel 302 is covered by a non-magnetic bearing assembly 318 that includes a self-lubricated axle 320 that can be configured to stabilize ferromagnetic wheel 302 during use by engaging a bearing of housing 102 (not depicted). In some embodiments, support surface 315 can take the form of a wall of an input device housing, such as housing 102 as depicted in FIG. 1. In some embodiments, support structure 317 can integrated or somehow incorporated into the wall of the input device housing.

FIG. 3C shows an exploded view of rotary input control 150 and support structure 317. In particular, teeth 304 do not extend axially through the central opening defined by ferromagnetic wheel 302 but instead leave space for a portion of bearing assembly 318 to engage ferromagnetic wheel 302 by an interference fit. The interference fit provides a simple way for bearing assembly 318 to be axially aligned with ferromagnetic wheel 302. Alternatively, ferromagnetic wheel 302 could also be adhesively coupled to one side of ferromagnetic wheel 302. FIG. 3C also shows how electropermanent magnet 300 can be coupled to support structure 316 as well as how a shaft 322 extends through a central region of electropermanent magnet 300. In particular, shaft 322 can extend between first permanent magnet 306 and second permanent magnet 308. Shaft 322 engages an opening defined by self-lubricated axle 320 to couple ferromagnetic wheel 302 to support structure 317. It should be noted that in some embodiments, bearing assembly 318 and support structure 317 can both be constructed of polymer material to avoid any unwanted interference with electropermanent magnet 300.

Figure 4A:
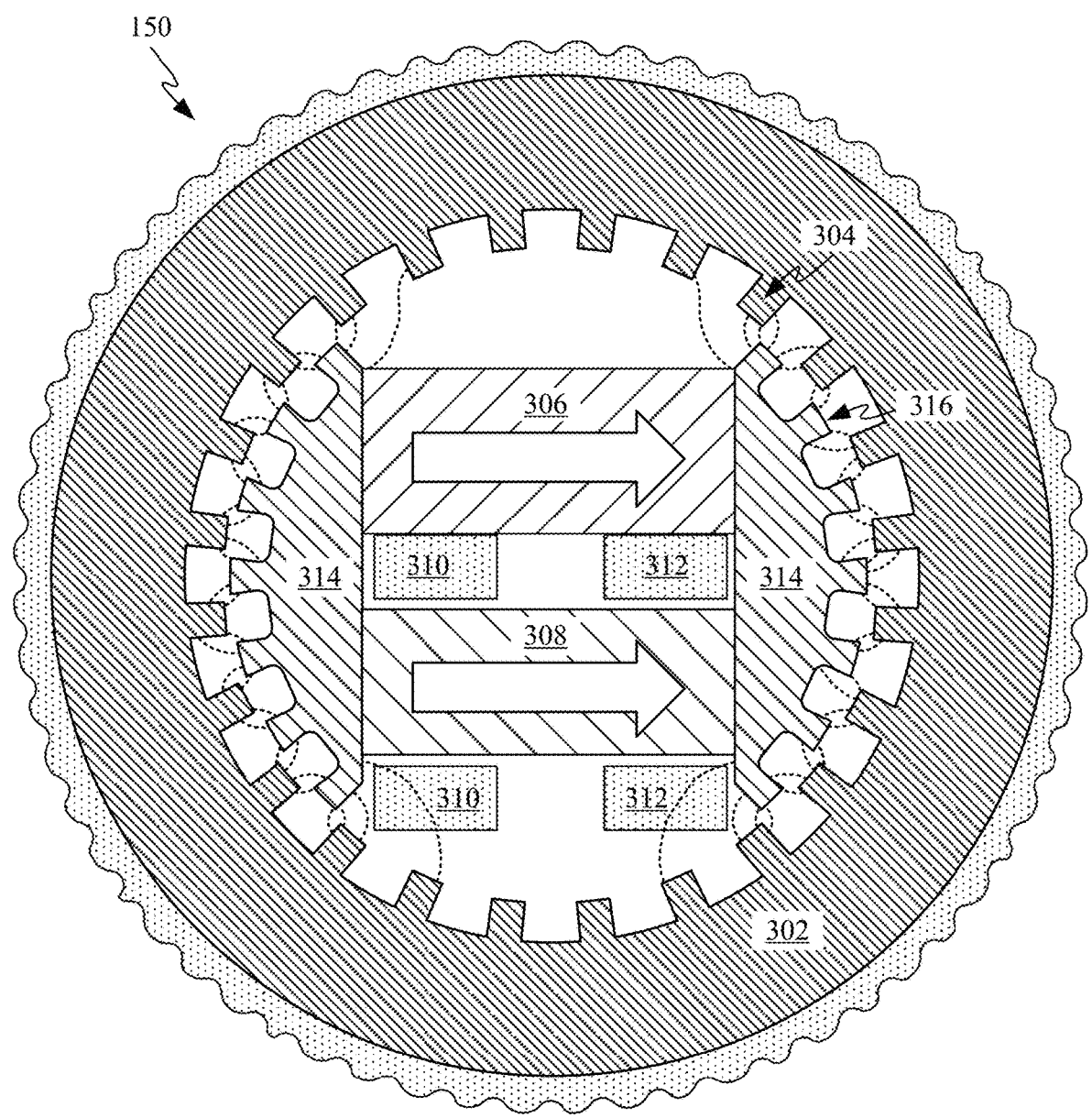
FIGS. 4A-4B show cross sectional views of the rotary input control in which a polarity of the magnetic fields emitted by the permanent magnets are oriented in the same direction.
Figure 4B:
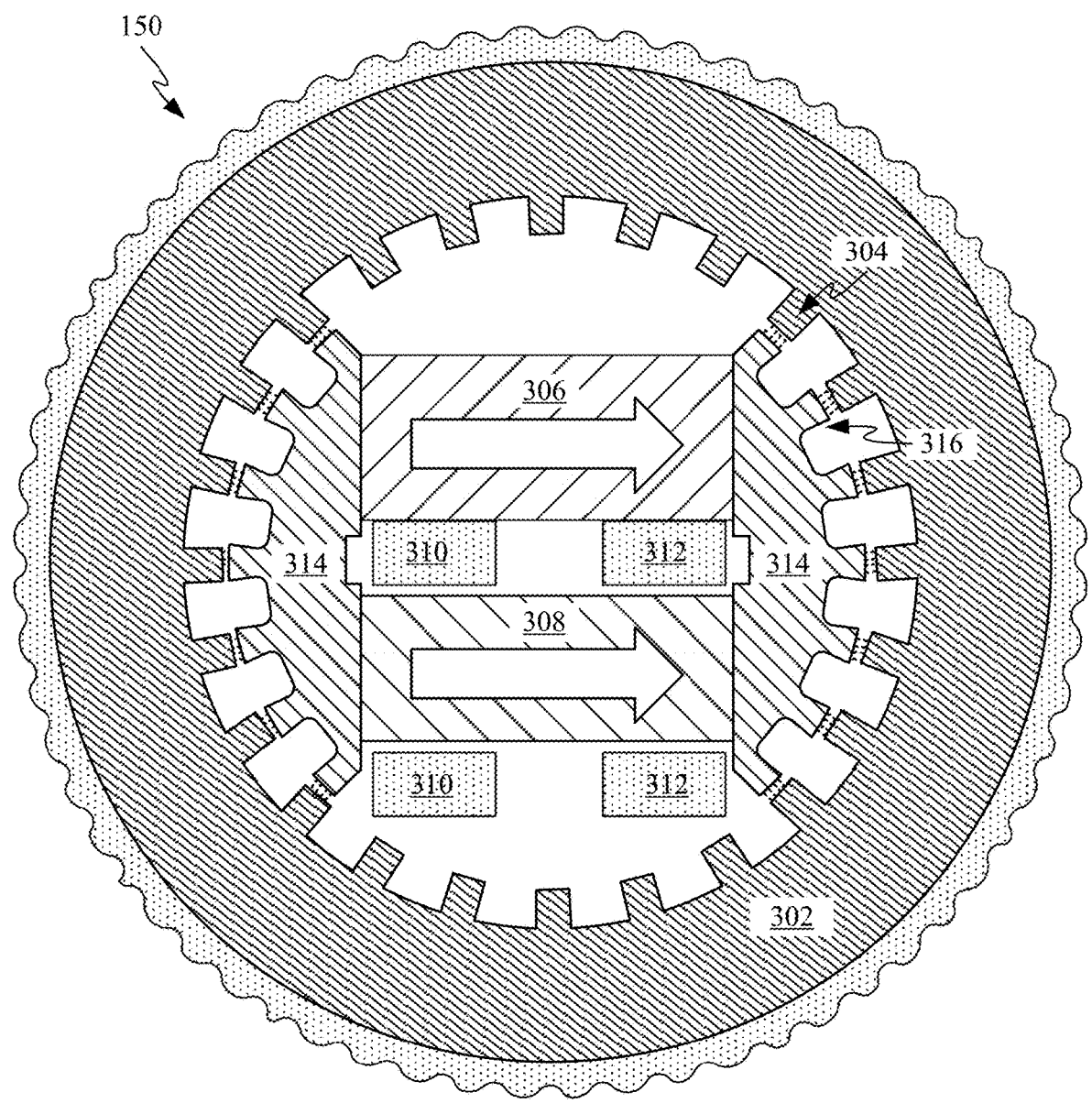

FIGS. 4A-4B show cross sectional views of rotary input control 150 in which a polarity of the magnetic fields emitted by permanent magnets 306 and 308 are oriented in the same direction. FIG. 4A shows how a magnetic flux emitted from radially protruding teeth 316 interacts with the ferromagnetic material making up teeth 304. In the depicted position, each of teeth 304 are positioned between two adjacent radially protruding teeth 304, which results in a resistance to rotation of ferromagnetic wheel 302 in either direction being low. However, when radially protruding teeth 316 are aligned with a respective one of teeth 304, as shown in FIG. 4B, rotation of ferromagnetic wheel 302 becomes more difficult due to rotation in either direction moving teeth 304 farther away from a respective one of radially protruding teeth 316. In this way, a resistance profile can provide a ratcheting feedback to a user without the need for any movement of electropermanent magnet 300. In some embodiments, ferromagnetic wheel can include a tactile ribbed layer that improves a grip of a user's finger on rotary input control 150.

Figure 4C:
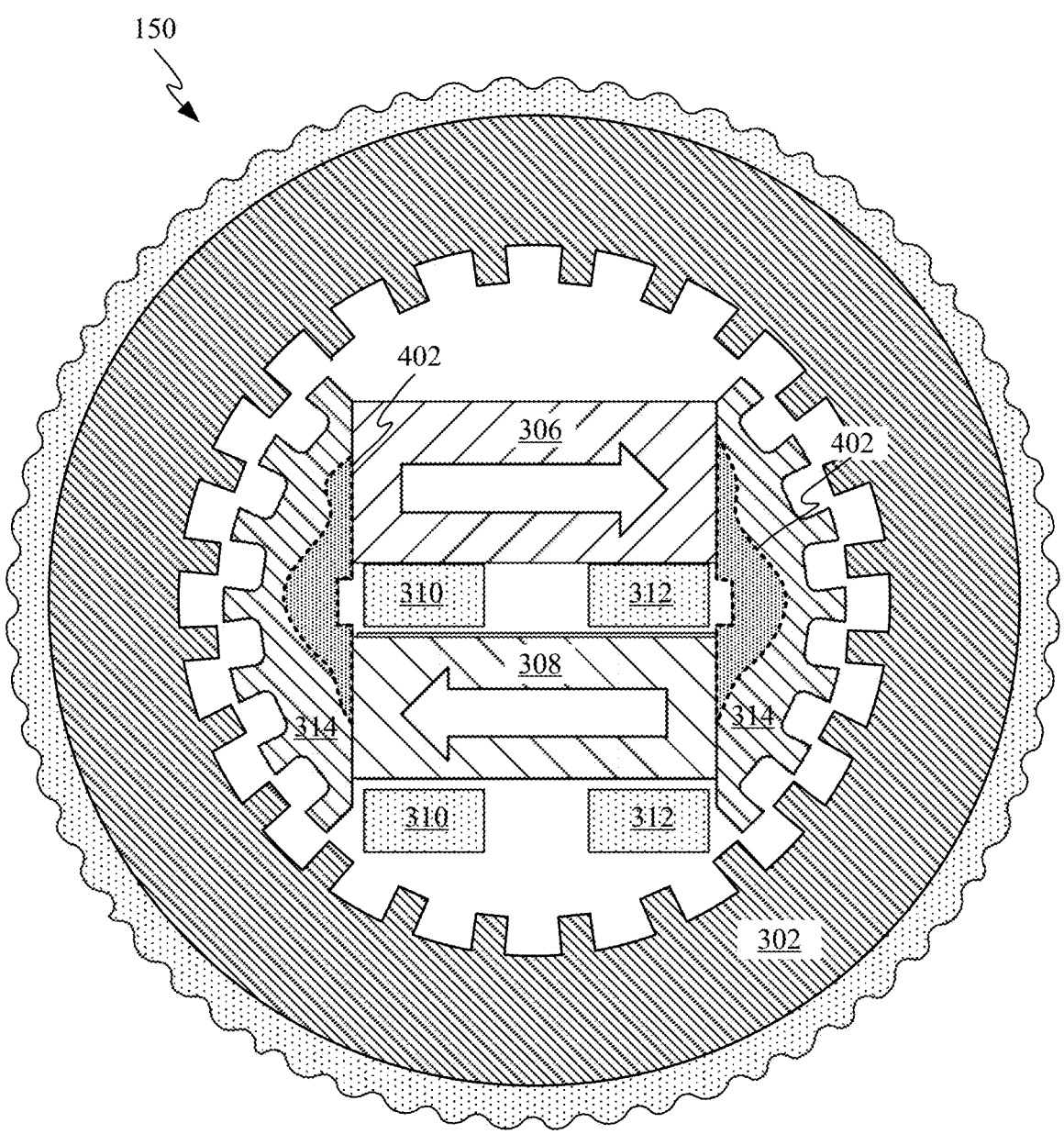
FIG. 4C shows another cross-sectional view of the rotary input control in which a polarity of permanent magnet 308 has been reversed.

FIG. 4C shows another cross-sectional view of rotary input control 150 in which a polarity of permanent magnet 308 has been reversed. This results in the magnetic flux 402 being contained within ferritic substrates 314 since the polarity of the permanent magnets allows magnetic flux 402 to circulate within the magnetic circuit defined by permanent magnets 306/308 and ferritic substrates 314. This results in there being little to no interaction between electropermanent magnet 300 and ferromagnetic wheel 302, which allows a user to experience no tactile feedback during rotation of rotary input control 150.

Figure 5A:
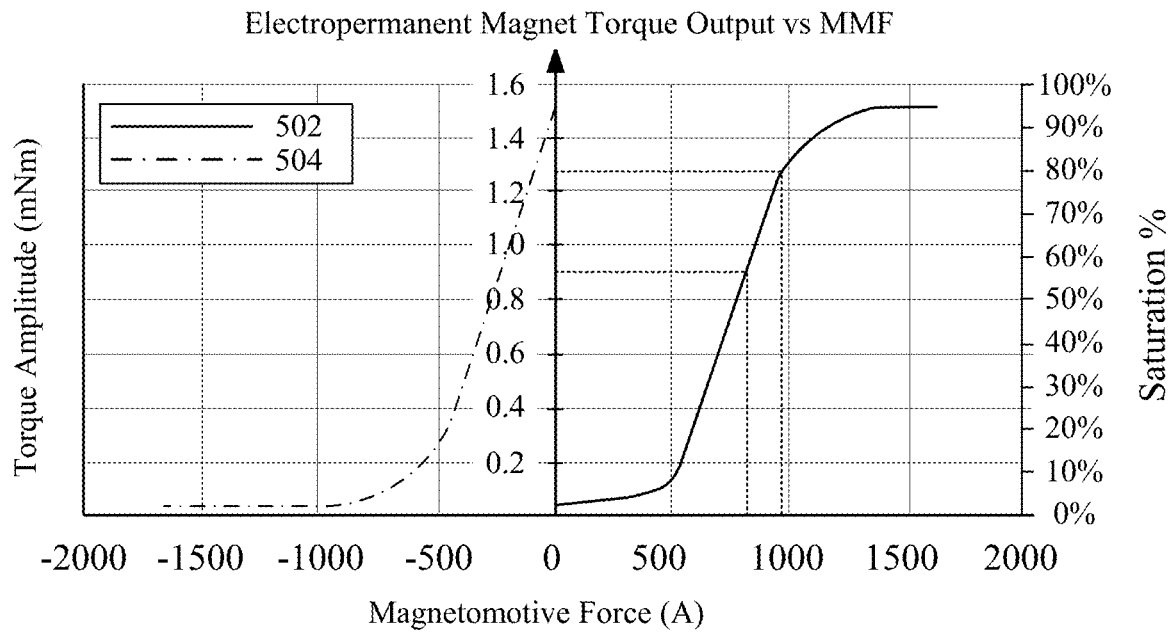
FIG. 5A shows a graph illustrating a first input contour and a second input contour indicating an amount of torque applied by the electropermanent magnet as a function of applied magnetomotive force (MMF)

FIG. 5A shows a graph illustrating a first input contour 502 and a second input contour 504 indicating an amount of torque applied by the electropermanent magnet as a function of applied magnetomotive force (MMF) to a permanent magnet. First input contour 502 shows how torque output of the electropermanent magnet increases when the MMF is in a first direction and second input contour 504 shows how torque output is reduced when the MMF is applied in a second direction opposite the first direction. First input contour 502 illustrates how a minimum MMF of about 700 A is needed to shift the polarity of the electropermanent magnet sufficiently to generate a noticeable amount of torque in response to rotation of a rotary input control by a user. The contour begins with a gradual slope since the magnetizing field applied opposes magnetic flux flowing through the electropermanent magnet and transitions to a linear profile from about 600 A to 900 A. The dotted lines show how torques of 0.9 and 1.2 mNm can be achieved by supplying different amounts of MMF. In this way, a resistance profile of the rotary input control can be tuned to a desired level, making it possible to switch between three or more different operating states, that include at least: a free-wheeling state, a first ratcheting state and a second ratcheting state.

Figure 5B:
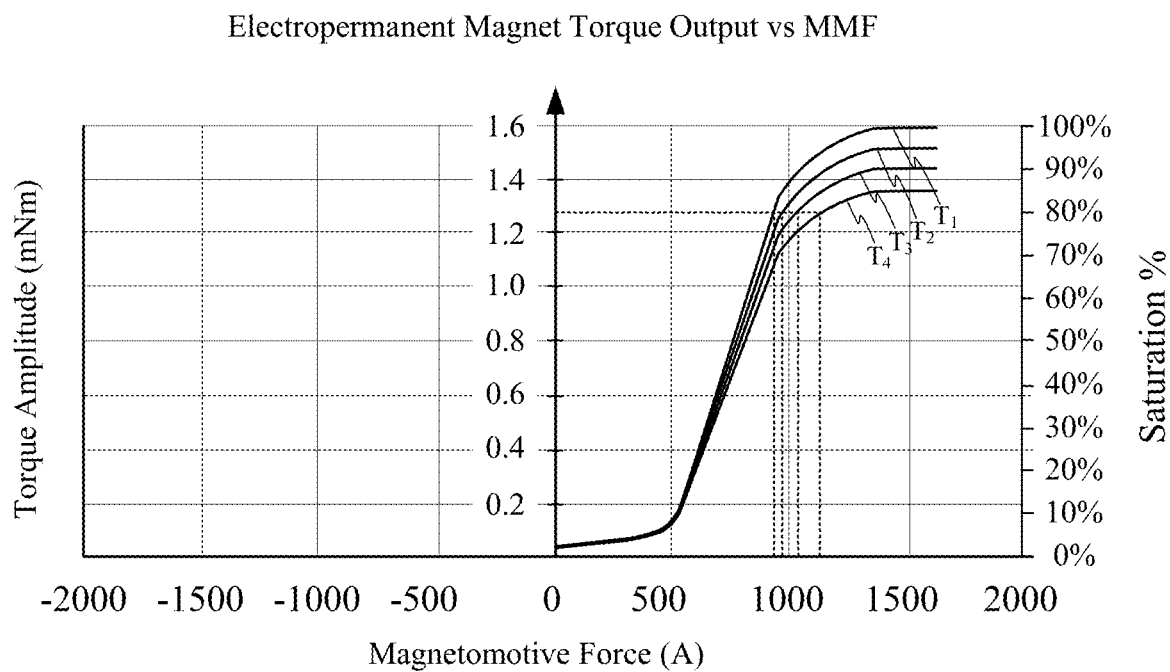
FIG. 5B shows another graph illustrating input contours $T_1$, $T_2$, $T_3$ and $T_4$.

FIG. 5B shows another graph illustrating input contours $T_1$, $T_2$, $T_3$ and $T_4$. The input contours represent how a peak saturation of the electropermanent magnet degrades over time. Degradation of the electropermanent magnet can be caused by many factors that include degradation of various components such as the magnetizing coils, capacitors for supplying charge to the electropermanent magnet, magnetic substrate degradation due to heat damage, and the like. Consequently, to achieve the same amount of torque a controller responsible for supplying electrical energy to the magnetizing coils can be increased as the magnetic material of the switchable polarity permanent magnet degrades after undergoing a certain amount of polarity switches. In some embodiments, the controller can include circuitry for achieving a desired amount of torque regardless of the state of degradation of the magnetic materials making up the electropermanent magnet. In some embodiments, the controller associated with the electropermanent magnet can include computer readable memory that stores analytics related to tracking aging of the components of the electropermanent magnet over time. In some embodiments, these analytics can be stored, accessed and/or manipulated through a cloud based portal. The control system can take many forms including a linear continuous current control system, a feed forward control system or a digital feedback loop with a switch mode current source. Each different type of control system has its own advantages and disadvantages. For example, a linear continuous current control system benefits from providing little to no EMI, is easy to integrate into an existing system, and is relatively inexpensive to produce. A switched mode continuous current control is able to save energy when a lower amount of electrical energy is needed to change a magnetization of the electropermenant magnet but tends to be relatively large and includes expensive components. Finally, a feed forward control system also gains battery life when relatively lower amounts of electrical energy are needed to change the magnetization of the electropermanent magnet but should be recalibrated periodically over its useful lifetime to achieve consistent resistance profile implementation and tends to be more costly to implement.

Figure 5C:
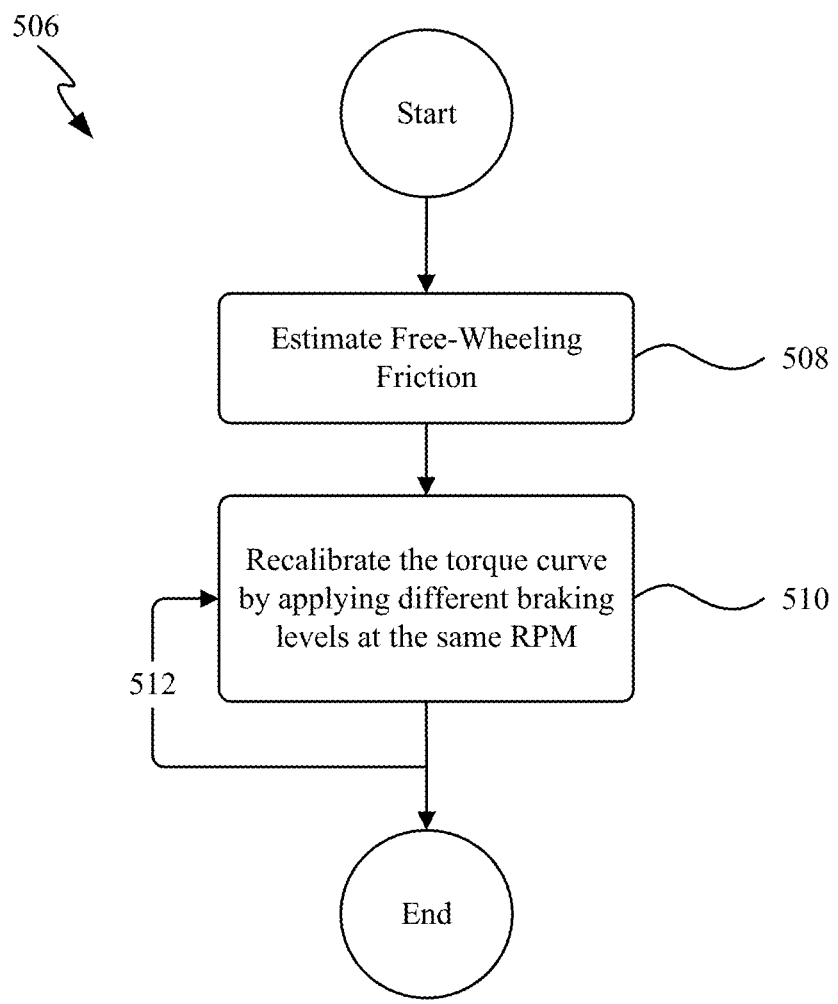
FIG. 5C shows a flow chart illustrating a method for calibrating a control system, according to certain embodiments.

FIG. 5C shows a flow chart 506 illustrating a method for calibrating a control system. Factory calibration is important to the proper functioning of the EPM and corresponding control system as the initial factory calibration determines the initial input contours which only tend to change slightly over time. If the determination of the amount of magnetomotive force (MMF) needed to achieve desired amounts of torque is even slightly off the resulting over or under magnetized permanent magnet of the EPM can severely impact performance of the rotary input control feedback. This is due in part to needing a very precise amount of MMF to achieve a desired amount of torque output due to the steep slope of the linear portion of the input contours. Periodic recalibration can be helpful in some instances including where various components in the electropermanent magnet assembly degrade over time changing the amount of charge needed to achieve a desired magnetic field strength. The periodic recalibration can be more or less useful depending on the type of control system being used. Flow chart 506 illustrates a method for calibrating or recalibrating an amount of resistance provided by a rotary control wheel. At 508, an estimation of free-wheeling friction can be made by asking a user to spin the rotary control while the electropermanent magnetic assembly is in a first state in which a magnetic field strength emitted by the electropermanent magnetic assembly is minimized. An RPM of the rotary control can then be tracked using a position sensor to measure a rate of decay of the RPM. This measurement can then be used to establish a new baseline resistance to rotation caused by factors such as bearing wear, additional friction caused by the build of contamination within and proximate to the rotary control wheel. Detection of a higher baseline resistance can be used to reduce an amount of resistance needed to be supplied by the electropermanent magnet assembly to generate a desired amount of resistance to rotation. At 510, the user can be asked to spin the rotary control again. During the rotation of the rotary input control the electropermanent magnet can be applied at different torque levels to observe a resulting amount of decay to the RPM. In this way, changes to the decay rate for the tested different torque levels can be used to generate a new torque curve allowing for a desired amount of torque to be generated at the rotary input control. In some embodiments, the user might be asked to spin the rotary input control multiple time to get accurate readings from a sufficiently large number of different torque settings. For example, a first amount of charge could be applied to the electropermanent magnet to determine a saturation point for the torque curved, while second, third and sometime more amounts of energy could be applied to identify a slope of a linear portion of the torque curve. In this way, a detailed torque curve can be determined to assist the control system in achieving an amount of torque necessary for many different uses. It should be noted that in some cases the torque curve can also be referred to as a calibration curve when the torque curve is updated to provide an accurate amount of resistance to rotation of the rotary control wheel.

Figure 6:
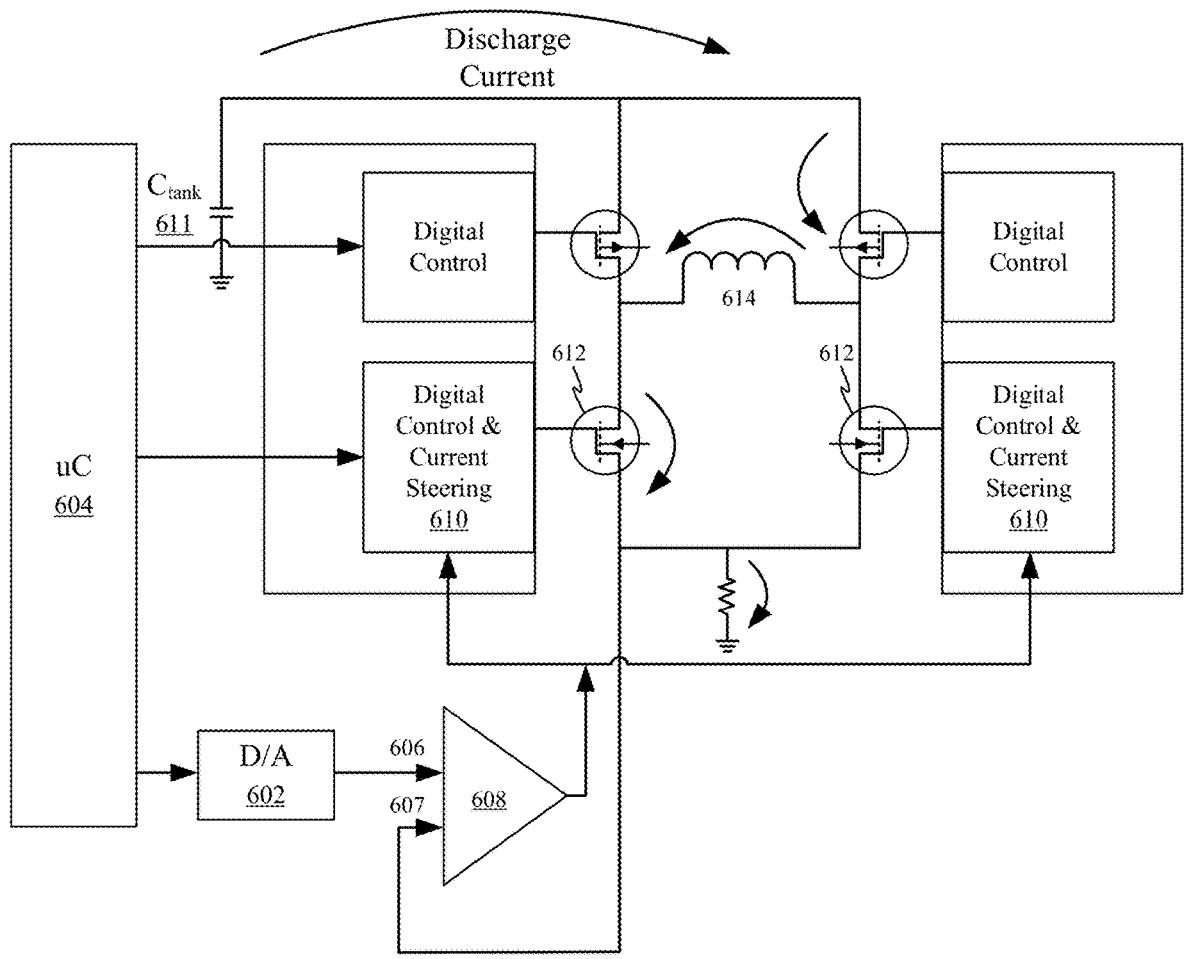
FIG. 6 shows an exemplary linear continuous current controller for regulating current to one or more magnetizing coils of an electropermanent magnet.

FIG. 6 shows an exemplary linear continuous current controller for regulating current to one or more magnetizing coils of an electro permanent magnet. Digital/Analog converter 602 can be configured to receive an input signal from micro-controller 604 and convert the input signal into a current setting 606 that is received by error amplifier 608 where it is compared to an amount of current 607 being generated by the system. Current setting 606 is supplied for a duration sufficient to provide a desired amount of electrical energy. In some embodiments, digital/analog controller 602 can be replaced by a pulse width modulator and integrator/filter combination that generates the current setting 606 from the input signal. A difference between the current being supplied to the magnetizing coil 607 and current setting 606 is amplified by error amplifier 608 and then used to at least partially control operation of digital control & current steering modules 610. Digital control & current steering modules 610 are configured to receive input signals from micro capacitor 604 and then control operation of bipolar junction transistor (BJT) 612 based on inputs from microcontroller 604 and error amplifier 608. In this way, an amount of current received at magnetizing coil 614 from tank capacitor 611 can be controlled in accordance with current setting 606. Because the control system is electronic, the controller can be configured to change the resistance profile generated by an associated electropermanent magnet in response to user inputs or in response to cues provided by an application being manipulated by the user input device. For example, rotation of the rotary input control could be temporarily paused by actuating magnetizing coil 614

Figure 7A:
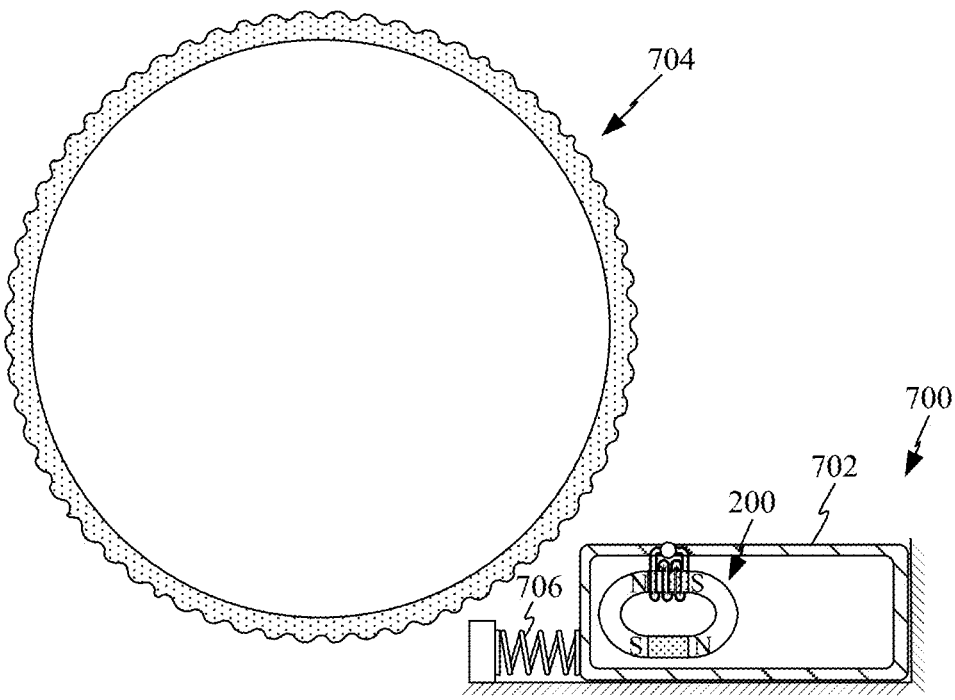
FIG. 7A shows a side view of an electropermanent magnet assembly for changing a resistance profile of a rotary input control.

FIG. 7A shows a side view of an electropermanent magnet assembly 700 for changing a resistance profile of a rotary input control. In particular, electropermanent magnet assembly 700 includes an electropermanent magnet 200 disposed within a housing 702 formed from magnetically neutral materials such as polymer or ceramic based materials. Electropermanent magnet 200 can be similar to or the same as the previously described electropermanent magnet 200 described in FIGS. 2A-2B and is depicted in a first state in which little to know magnetic field is emitted from electropermanent magnet 200. Housing 702 can be positioned upon a supporting surface and biased away from wheel 704 by biasing mechanism 706. Biasing mechanism 706 can be configured to prevent housing 702 from contacting wheel 704 while electropermanent magnet 200 is in the first state where electropermanent magnet 200 is not emitting a magnetic field.

Figure 7B:
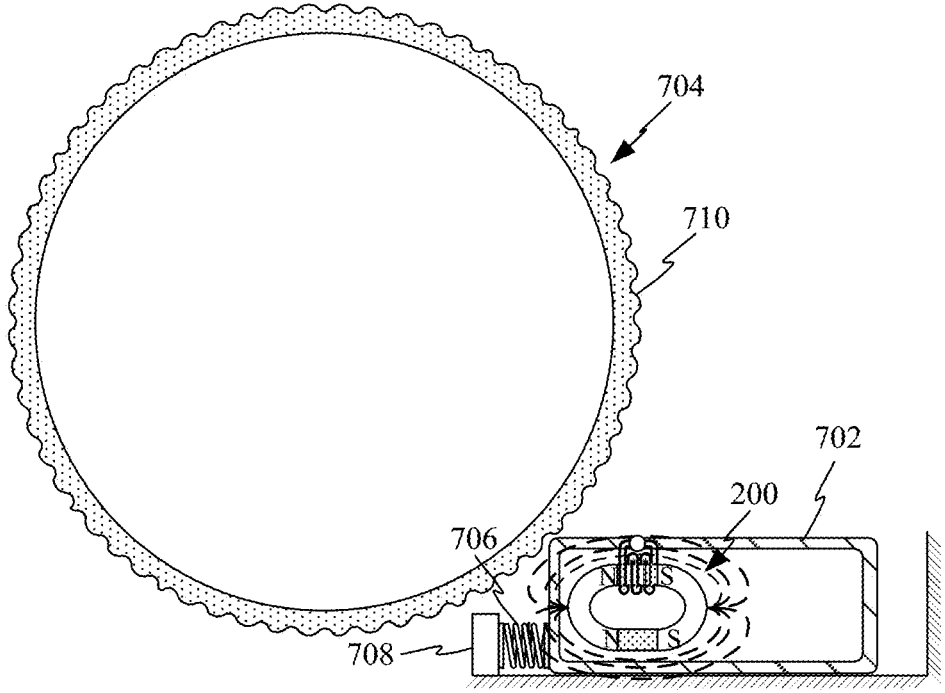
FIG. 7B shows how when the electropermanent magnet assembly is in a second state a magnetic field emitted from electropermanent magnet extends through one or more walls of housing.

FIG. 7B shows how when electropermanent magnet 200 is in a second state a magnetic field emitted from electropermanent magnet 200 extends through one or more walls of housing 702. The magnetic field is then able to interact with magnetically attractable materials incorporated within wheel 704 and/or support structure 708 associated with biasing mechanism 706 and generate a force that overcomes the force applied by biasing mechanism 706 to push a corner of housing 702 into at least periodic contact with wheel 704. Wheel 704 includes an irregular or rigid exterior surface that interacts with the corner of housing 702 to provide ratcheting feedback to a user during rotation of wheel 704. It should be appreciated that by increasing or decreasing the strength of the field emitted by electropermanent magnet 200 a resistance profile associated with wheel 704 can be fine-tuned or changed in order to suit a given circumstance. For example, for some embodiments, it can be beneficial to configure electropermanent magnet 200 to press the corner of housing 702 into wheel 704 to such an extent that wheel 704 is completely prevented from moving.

Figure 8:
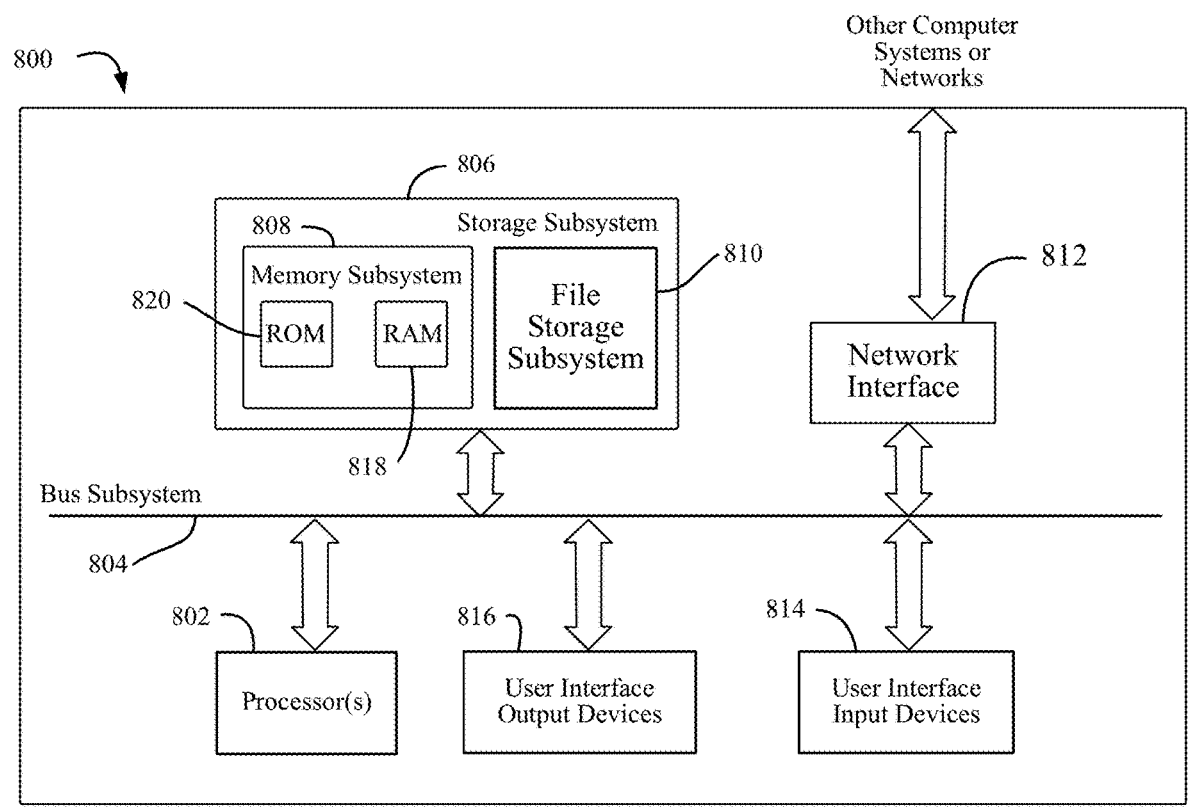
FIG. 8 illustrate a system for implementing certain features of peripheral devices disclosed herein.

FIG. 8 shows a system 800 for operating a host computing device (e.g., host computing device 810), according to certain embodiments. System 800 can be used to implement any of the host computing devices or peripheral interface devices discussed herein and the myriad embodiments defined herein or within the purview of this disclosure but not necessarily explicitly described. System 800 can include one or more processors 802 that can communicate with a number of peripheral devices (e.g., input devices) via a bus subsystem 804. These peripheral devices can include storage subsystem 806 (comprising memory subsystem 808 and file storage subsystem 810), user interface input devices 814, user interface output devices 816, and network interface subsystem 812. User input devices 814 can be any of the input device types described herein (e.g., keyboard, computer mouse, remote control, etc.). User output devices 816 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 804 can provide a mechanism for letting the various components and subsystems of computer system 800 communicate with each other as intended. Although internal bus subsystem 804 is shown schematically as a single bus, alternative embodiments of the bus subsystem can utilize multiple buses. Additionally, network interface subsystem 812 can serve as an interface for communicating data between computer system 800 and other computer systems or networks. Embodiments of network interface subsystem 812 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.).

In some cases, user interface input devices 814 can include a keyboard, a presenter, a pointing device (e.g., mouse, trackball, touchpad, etc.), a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 800. Additionally, user interface output devices 816 can include a display subsystem, a printer, or non-visual displays such as audio output devices, etc. The display subsystem can be any known type of display device. In general, use of the term "output device" is intended to include all possible types of devices and mechanisms for outputting information from computer system 800.

Storage subsystem 806 can include memory subsystem 808 and file storage subsystem 810. Memory subsystems 808 and file storage subsystem 810 represent non-transitory computer-readable storage media that can store program code and/or data that provide the functionality of embodiments of the present disclosure. In some embodiments, memory subsystem 808 can include a number of memories including main random access memory (RAM) 818 for storage of instructions and data during program execution and read-only memory (ROM) 820 in which fixed instructions may be stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and not intended to limit embodiments of the present disclosure. Many other configurations having more or fewer components than system 800 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A user input device, comprising:
a rotary input control, comprising:
a wheel; and
an electropermanent magnet assembly, comprising:
a magnetizing coil, and
a permanent magnet coupled to the magnetizing coil and emitting a magnetic field; and
a control system configured to modulate an amount of electrical current supplied to the magnetizing coil to change a resistance profile within a linear torque region of the electropermanent magnet assembly for the rotary input control, the modulation switching the permanent magnet from a first state with a first resistance profile for freewheeling in which the magnetic field has a first magnetic flux and operates within the linear torque region to a second state with a second resistance profile in which the magnetic field has a second magnetic flux greater than the first magnetic flux and operates within the linear torque region, the magnetic field having a same polarity in both the first and second states,
wherein the control system modulates the amount of current supplied to the magnetizing coil based on a generated error signal corresponding to a difference measurement between a current supplied to the magnetizing coil and a new current setting corresponding to the second state; and
wherein the control system recalibrates an amount of current supplied to the magnetizing coil in the first state by measuring a rate of decay of an RPM of the wheel and using the rate of decay to establish a new baseline resistance.

2. The user input device as recited in claim 1, wherein in the first state the resistance profile applies no force to the wheel, and wherein in the second state the resistance profile applies a ratcheting force to the wheel.

3. The user input device as recited in claim 1, wherein in the first state the resistance profile is applied by interaction between a magnetic field emitted by the electropermanent magnet assembly and magnetically attractable materials of the wheel.

4. A user input device, comprising:
a rotary input control, comprising:
  a wheel;
  a magnetizing coil;
  a first permanent magnet extending through the magnetizing coil;
  a second permanent magnet, the first permanent magnet and the second permanent magnet being configured to set a resistance profile for the wheel by cooperatively emitting a magnetic field that is operable to oppose rotation of the wheel; and
a control system configured to switch between three or more different resistance profiles of the wheel by varying an amount of electrical current supplied to the magnetizing coil,
wherein at least two of the three or more different resistance profiles are of a same polarity and within a linear torque region of the first permanent magnet,
wherein the linear torque region of the first permanent magnet is between a minimum and maximum magnetic flux state for the first permanent magnet,
wherein the control system modulates the amount of current supplied to the magnetizing coil based on a generated error signal corresponding to a difference measurement between a current supplied to the magnetizing coil and a new current setting; and
wherein the control system recalibrates an amount of current supplied to the magnetizing coil in a first state by measuring a rate of decay of an RPM of the wheel and using the rate of decay to establish a new baseline resistance.

5. The user input device as recited in claim 4, wherein the user input device is a mouse.

6. The user input device as recited in claim 1 wherein the generated error signal further controls a digital control and current steering system configured to control a current through a transistor network that sets the amount of current supplied to the magnetizing coil.

7. The user input device as recited in claim 6 wherein the transistor network includes two sets of bipolar junction transistors configured in parallel around the magnetizing coil.

8. The user input device as recited in claim 6 wherein the transistor network includes two sets of junction field effect transistors configured in parallel around the magnetizing coil.

9. The user input device as recited in claim 1 wherein the generated error signal is generated by a difference amplifier.

10. The user input device as recited in claim 9 wherein the new current setting is provided by a microprocessor and converted from a digital signal to an analog signal by a digital-to-analog converter.

11. The user input device as recited in claim 9 wherein the new current setting is provided by a microprocessor and converted from a digital signal to an analog signal by a pulse width modulator and integrator with filter circuit topology.

12. The user input device of claim 1 wherein the control system is further configured to:
  receive revolutions-per-second (RPM) data corresponding to a free-wheeling friction associated with the wheel that is in rotation;
  determine a rotational rate-of-decay of the wheel in rotation and a corresponding baseline resistance of rotation;
  modulate an amount of electrical current supplied to the magnetizing coil in the electropermanent magnet assembly to change a torque curve for the wheel based on a difference between the rotational rate-of-decay and a reference rate-of-decay, the electropermanent magnet assembly providing a magnetic resistance to rotation of the wheel, and the torque curve providing one or more braking profiles for the wheel.

13. The user input device of claim 12 wherein the RPM of the wheel is tracked using a position sensor to measure rate of decay of the RPM.

14. The user input device of claim 12 wherein the wheel is a scroll wheel and the user input device is a computer mouse.

* * * * *